Jan. 15, 1952     C. J. HUEBER     2,582,780
PUNCHING APPARATUS
Filed Oct. 23, 1948     10 Sheets-Sheet 1

Inventor:
Carl J. Hueber
By Wallace and Cannon
Attorneys

Jan. 15, 1952     C. J. HUEBER     2,582,780
PUNCHING APPARATUS
Filed Oct. 23, 1948     10 Sheets-Sheet 2
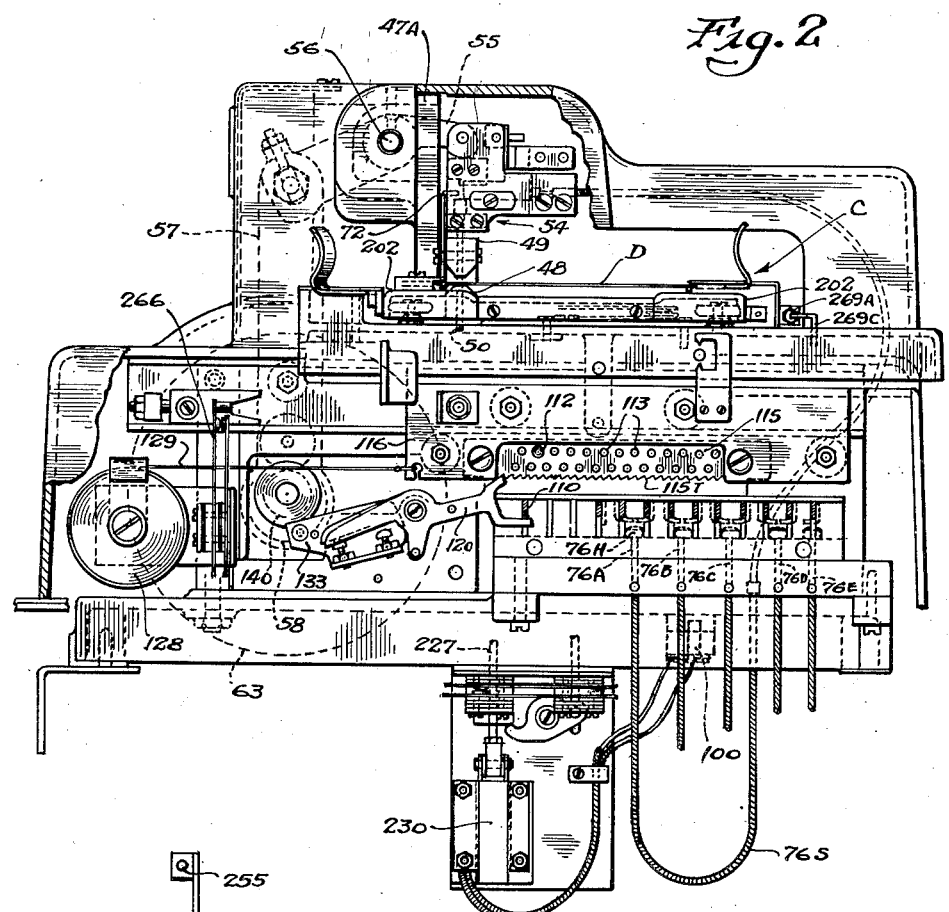
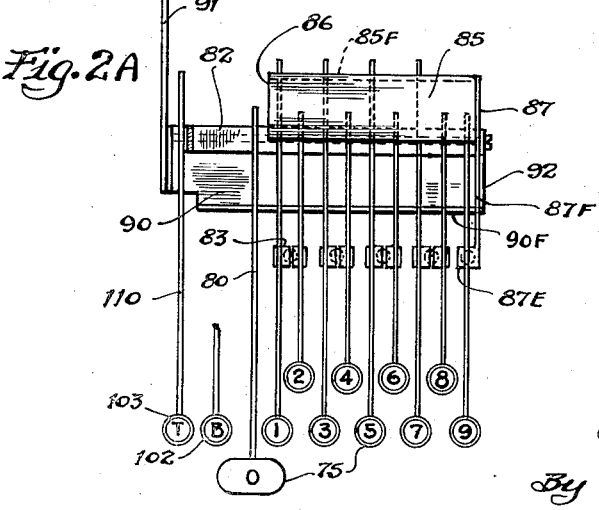
Inventor:
Carl J. Hueber
By Wallace and Cannon
Attorneys Jan. 15, 1952     C. J. HUEBER     2,582,780
PUNCHING APPARATUS
Filed Oct. 23, 1948     10 Sheets-Sheet 3
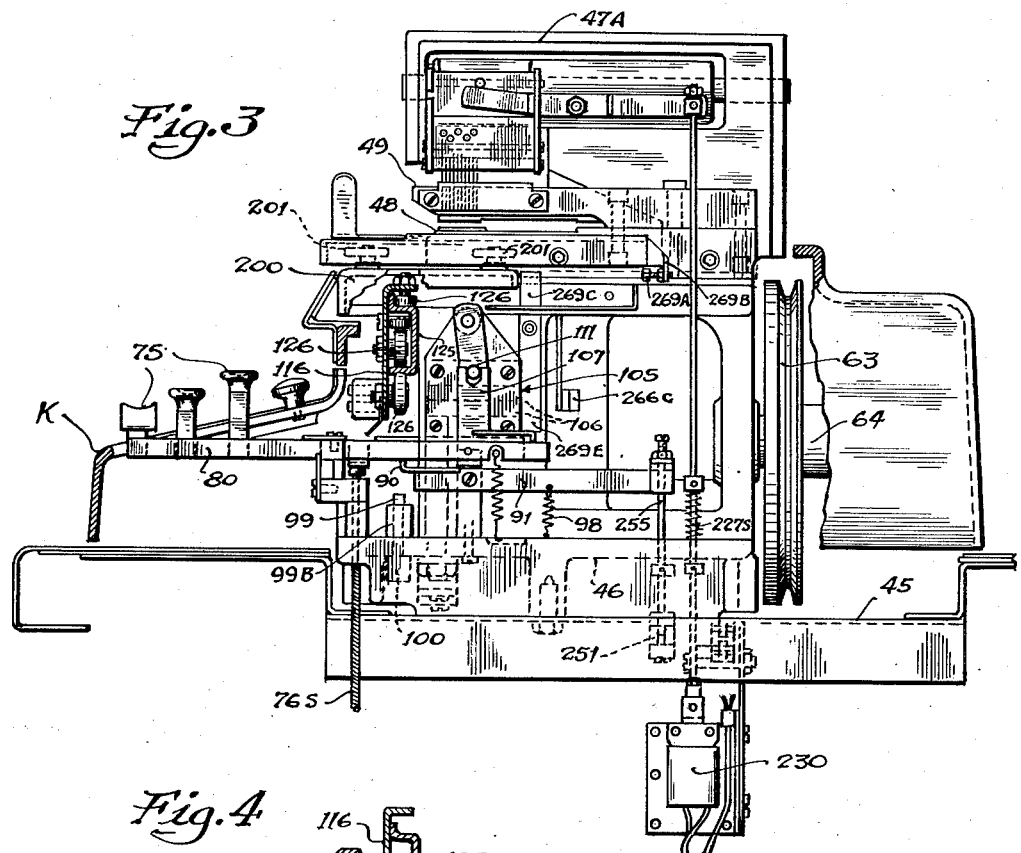
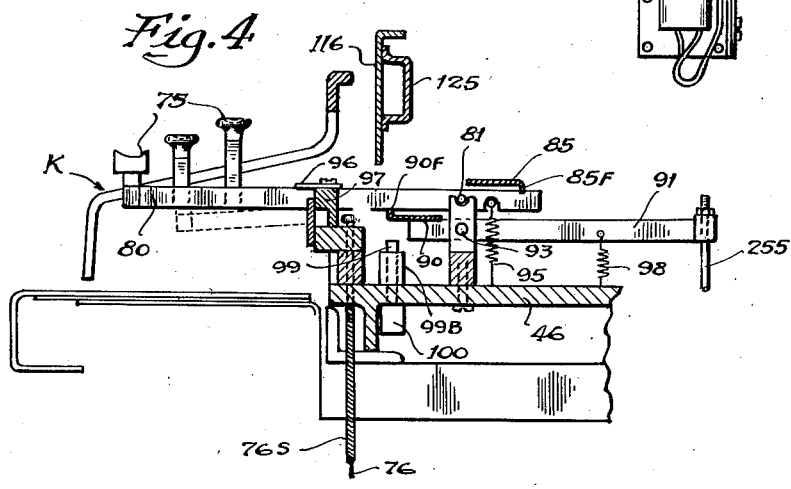
Inventor:
Carl J. Hueber
By Wallace and Cannon
Attorneys Jan. 15, 1952   C. J. HUEBER   2,582,780
PUNCHING APPARATUS
Filed Oct. 23, 1948   10 Sheets-Sheet 4
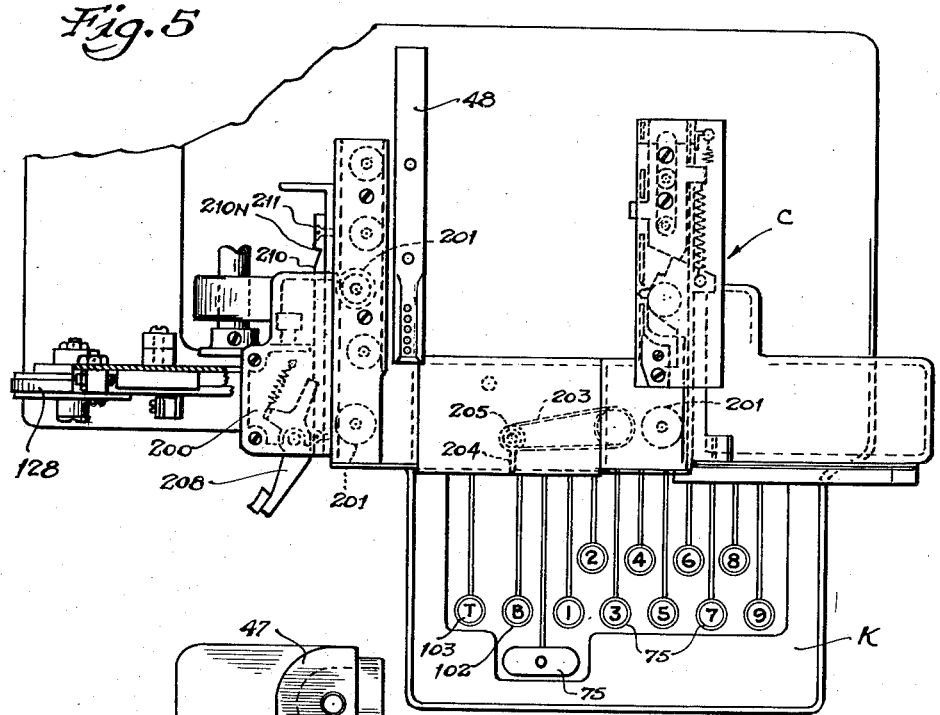
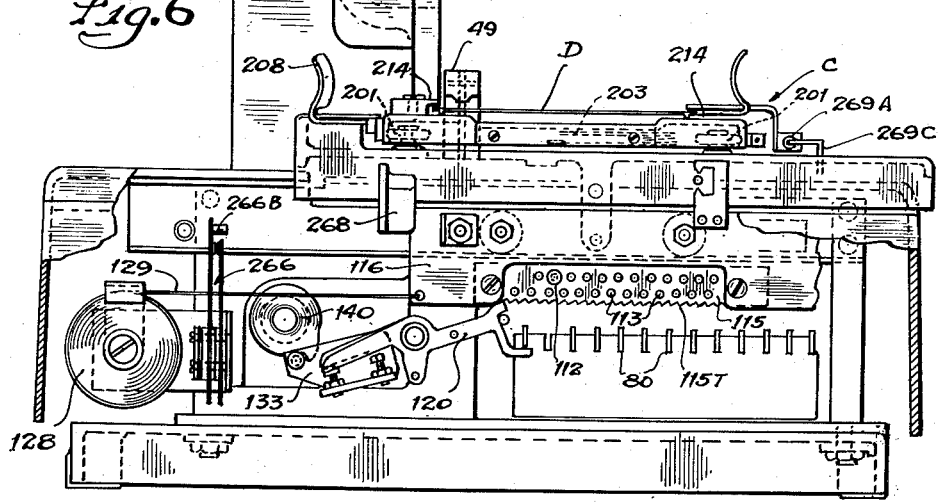
Inventor:
Carl J. Hueber
By Wallace and Cannon
Attorneys Jan. 15, 1952     C. J. HUEBER     2,582,780
PUNCHING APPARATUS Filed Oct. 23, 1948     10 Sheets-Sheet 5

Inventor:
Carl J. Hueber
By Wallace and Cannon
Attorneys

Jan. 15, 1952  C. J. HUEBER  2,582,780
PUNCHING APPARATUS
Filed Oct. 23, 1948  10 Sheets-Sheet 6

Inventor:
Carl J. Hueber
By Wallace and Cannon
Attorneys

Jan. 15, 1952
C. J. HUEBER
2,582,780
PUNCHING APPARATUS
Filed Oct. 23, 1948
10 Sheets-Sheet 7
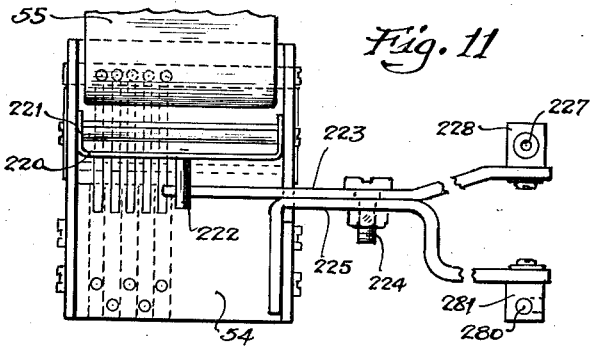
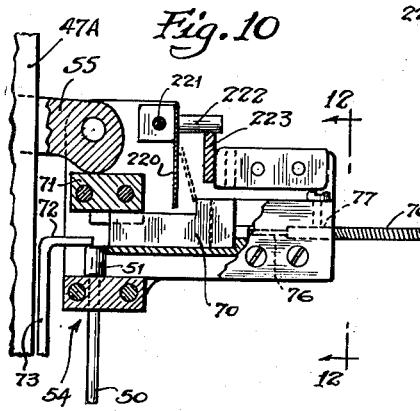
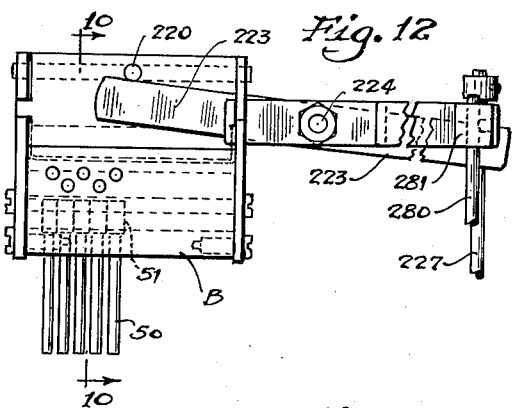
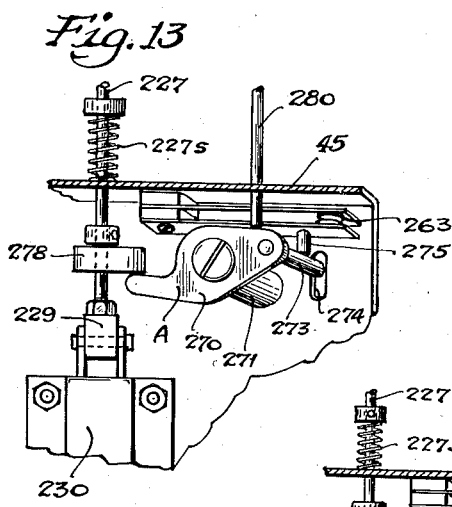
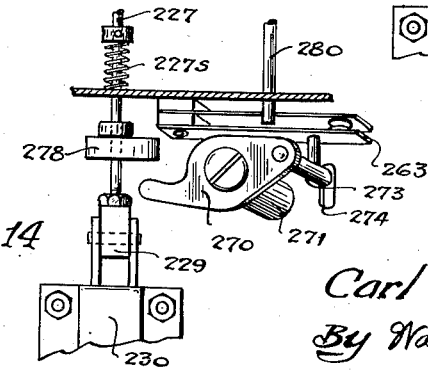
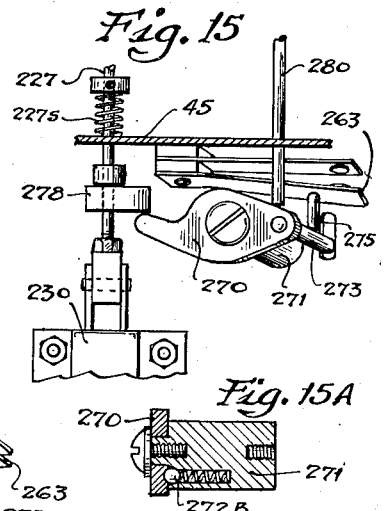
Inventor:
Carl J. Hueber
By Wallace and Cannon
Attorneys Jan. 15, 1952
C. J. HUEBER
2,582,780
PUNCHING APPARATUS
Filed Oct. 23, 1948
10 Sheets-Sheet 8
Fig. 16
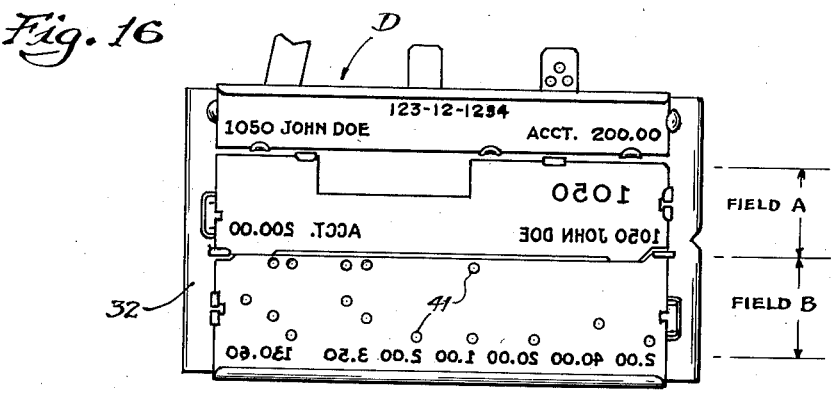
Fig. 17
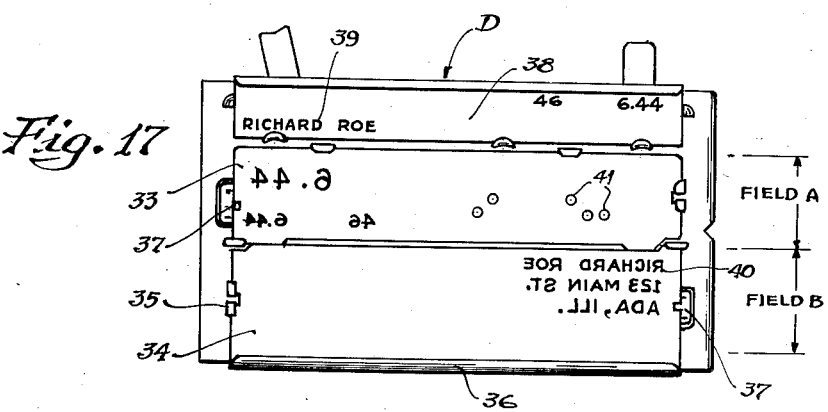
Fig. 18
Inventor:
Carl J. Hueber
By Wallace and Cannon
Attorneys

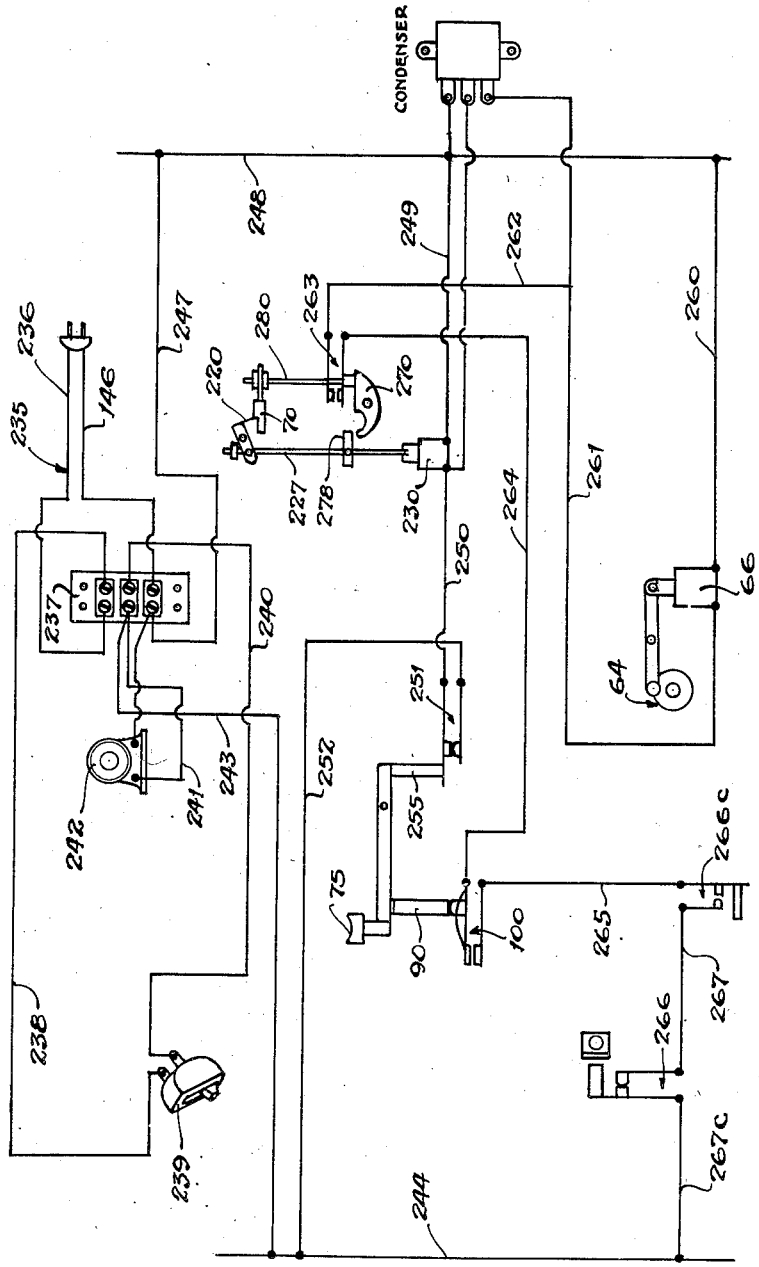

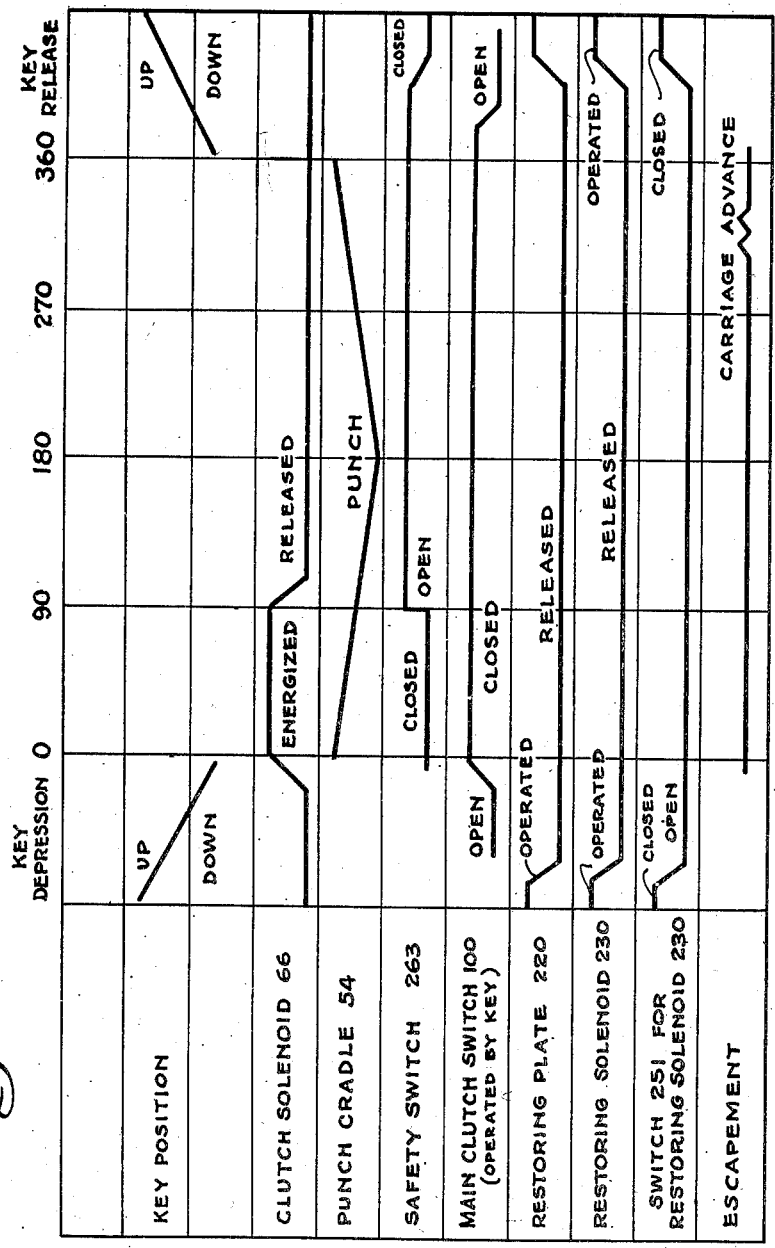

Patented Jan. 15, 1952

2,582,780

UNITED STATES PATENT OFFICE 2,582,780

PUNCHING APPARATUS

Carl J. Hueber, Euclid, Ohio, assignor to Addressograph-Multigraph Corporation, Wilmington, Del., a corporation of Delaware Application October 23, 1948, Serial No. 56,220

13 Claims. (Cl. 164—112)

This invention realtes to punching apparatus for producing coded data representing perforations in printing and control devices and the like, and particularly the invention relates to improvements in such apparatus whereby the use thereof is simplified and made more accurate.

In my prior Patent No. 2,397,112, patented March 26, 1946, a punching apparatus is illustrated whereby coded data representing perforations may be made in printing and control devices and the like, and an important object of the present invention is to improve and simplify apparatus of the character illustrated in my aforesaid prior patent.

Printing and control devices of the character that are adapted to be perforated by the punching apparatus of my aforesaid prior patent are usually of a limited size, and hence the amount or quantity of data that may be represented therein by coded perforations is somewhat limited. It has been customary in most instances heretofore to utilize such printing and control devices with but a single field to receive coded data representing perforations, but in the patent to Comegys No. 2,425,305, patented August 12, 1947, a printing and control device is illustrated in which two distinct fields are afforded to receive coded data representing perforations. Heretofore it has been necessary to afford a separate punching apparatus for producing the data representing perforations in each of the fields of such a printing and control device, and an important object of the present invention is to enable such data representing perforations to be produced in the same machine, and to enable the field in which the data representing perforations are to be formed to be readily and easily selected by the operator. More specifically, it is an object of the present invention to enable the work supporting carriage in such a punching apparatus to be readily shiftable between different positions so as to thereby dispose one field or another of a printing and control device in an operative relationship with respect to the punching elements of the apparatus.

In the use of punching apparatus of the aforesaid character, it has been quite a common experience for an operator to partially depress a control key in such a way that incorrect setting of the control elements of the punching apparatus is produced, and it is a further and important object of the present invention to enable such incorrect setting of the control elements of a punching apparatus to be avoided. More specifically, it is an object of the present invention to enable the control elements of a punching apparatus to be maintained in a restored relationship at all times when the keys of the apparatus are in their inactive or raised positions. An object related to the foregoing is to enable the control keys of such a punching apparatus to control not only the releasing of the restoring mechanism of the punch controlling interposers, but also to enable such keys to govern the restoring action of the interposers.

When punching apparatus of the aforesaid character is operated through a punching cycle, it sometimes happens that the operator holds a key in a depressed position for too long a time, and under such circumstances it is important that an undesired second or repeat operation of the punching apparatus be prevented, and to accomplish this in a simple and improved manner is another important object of the invention. More specifically, it is an object of the present invention to disable the clutch control or engaging means as an incident to punch operation, and to restore the clutch control means to an operative condition only when the punch selecting interposers have been restored.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a plan view showing a punching apparatus embodying the features of the invention;

Fig. 1A is a fragmentary perspective view of a portion of the control mechanism;

Fig. 2 is a vertical sectional view taken substantially along the line 2—2 of Fig. 1;

Fig. 2A is a fragmentary plan view of the key lever system;

Fig. 3 is a vertical sectional view taken from front to rear in the machine and along the line 3—3 of Fig. 1;

Fig. 4 is a fragmentary vertical sectional view taken substantially along the line 4—4 of Fig. 1;

Fig. 5 is a plan section similar to Fig. 1 and illustrating other details of structure;

Fig. 6 is a vertical section similar to Fig. 2 and illustrating different details of structure;

Fig. 10 is a vertical sectional view taken substantially along the line 10—10 in Fig. 12 and illustrating the relationship of the interposers to the restoring mechanism and to the punch operating elements;

Fig. 11 is a plan view of the mechanism shown in Fig. 10;

Fig. 12 is a view taken from the line 12—12 in Fig. 10;

Figs. 13, 14 and 15 are perspective views illustrating certain elements of the control mechanism in different actuated positions;

Fig. 15A is a fragmentary sectional view showing a ball detent used in the control means;

Figs. 16 and 17 are front views of a printing and control device having two different fields for receiving data representing perforations;

Fig. 18 is a diagrammatic view illustrating the code employed in producing perforations representative of the different significant digits and zero;

Fig. 19 is a schematic wiring diagram; and

Fig. 20 is a timing chart.

Figure 7:
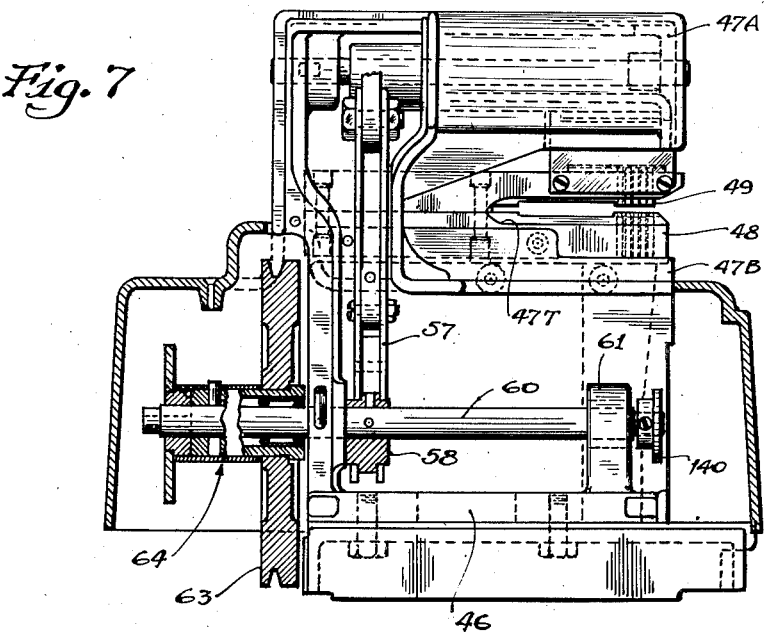
Fig. 7 is a vertical sectional view taken substantially along the line 7—7 of Fig. 1.

For purposes of disclosure, the invention is herein illustrated as embodied in a key punch 30 adapted to produce coded numerical data representing perforations, in accordance with the code illustrated in Fig. 17, and in either field A or field B, of printing and control devices D, such as those shown in Figs. 16 and 17 of the drawings. These printing and control devices D are of the kind shown in the aforesaid Comegys Patent No. 2,425,304, and each printing and control device D embodies a metal frame 32 upon which embossable metal printing plates 33 and 34 are releasably secured by means including retaining devices 35 and 36 and spring tongues 37 as described in the aforesaid Comegys patent. The frame 32 also has an index card 38 along its upper edge which may carry a printed impression 39 of a portion of embossed type characters 40 that are embossed upon one of the printing plates 33 or 34. Reference may be had to the aforesaid Comegys patent for details of structure of the printing devices D, but it should be observed that as disclosed therein, the area occupied by the printing plate 33 affords a field A in which coded data representing perforations 41 may be disposed. Also, it should be observed that the printing plate 34, in a portion of its area, affords a field B in which data representing perforations 41 may also be formed, and these fields A and B extend longitudinally of the printing devices D. Thus, each field is in effect divided into a series of columns or positions so that data representing perforations 41 may be formed in each one of these columns to represent a digit in accordance with the code illustrated in Fig. 18 of the drawings.

The punching apparatus 30 as illustrated in the drawings is in many respects similar to the punching apparatus shown in my aforesaid prior patent, and as will be evident in Figs. 1 to 7 of the drawings, this machine embodies a horizontal mounting plate 45 upon which a frame 46 is secured. The frame 46 has an upstanding column 47 formed adjacent the left-hand end thereof as viewed in Fig. 1, and this column 47 has a forwardly extending upper arm 47A and a forwardly projecting lower portion 47B which serve to define a forwardly opening horizontal throat 47T to receive the printing devices D that are carried on and shifted in a character spacing direction by a carriage C so that the punching operations may be performed on the printing devices in the space or throat between the forward ends of the column portions 47A and 47B.

The lower column portion 47B has a stationary die block 48 fixed thereto, as will be evident in Figs. 1, 2 and 7, and directly above the die block 48, a guide block 49 is disposed. In the present instance the guide block 49 has five vertically extended apertures or guide bores formed therein to receive a plurality of punches 50, and these punches are formed with enlarged upper heads 51 as shown in Fig. 10 so that these punches may be slidably carried in a punch supporting cradle 54 that is supported for vertical movement along the face of the arm 47A of the column 47. This punch supporting cradle is quite similar to that illustrated and described in my aforesaid prior patent, and the cradle 54 is carried on one end of an operating rocker 55, this rocker 55 being pivoted as shown in Fig. 2 on a supporting shaft 56 that is carried in the upper arm 47A of the column 47. As will be evident in Fig. 2, the cradle 54 is disposed on the right hand side of the column portion 47A, so that the supporting arm 55 extends through the column and has its other end disposed a substantial distance on the left-hand side of the column as viewed in Fig. 2. At its other end, the rocker 55 is connected by a vertical link 57 to an eccentric 58 that is afforded on a main drive shaft 60. The main drive shaft 60 is supported in upstanding bearings 61 formed on the frame 46, and on the rear end of the shaft 60, a constantly driven pulley 63 is mounted in what may be termed a loose or freely rotatable relationship. The pulley 63 affords the power for driving the punching mechanism and is connected to the main shaft 60 by a single cycle clutch 64, which may be of the character illustrated in my aforesaid patent. The single cycle clutch 64 is arranged to be controlled by a stop arm 65 and a solenoid 66, and when the solenoid 66 is momentarily energized, the stop arm 65 is shifted to its released position so that the clutch 64 becomes engaged for a single cycle driving operation in respect to the main shaft 60 of the punching mechanism.

When the main drive shaft 60 is thus operated through its single cycle of operation, the link 57 is moved upwardly from the position shown in Fig. 2 so as to shift the cradle 54 in a downward direction, and in the last half of the cycle, the cradle 54 is withdrawn in an upward direction to the position shown in Fig. 1. During this reciprocating cycle of the cradle 54, any one or more of the punches 50 may be caused to be positively actuated by the cradle so as to produce perforations 41 in a printing device D that is disposed in the throat of the punching apparatus between the guide block 49 and the die block 48. Such selection of the punches 50 for punching operation is attained in a manner quite similar to the mode of operation employed in the machine illustrated in my aforesaid prior patent, and, as illustrated in Figs. 10 to 12 hereof, this is attained by a plurality of interposers 70 that are slidably mounted on the cradle 54 for horizontal movement between right-hand or restored positions as shown in Fig. 10, and left-hand or effective positions wherein the left-hand ends of such interposers are disposed between the heads 51 of the punches 50 and an upper bar 71 that forms a fixed and rigid element of the cradle 54.

When an interposer 70 is pushed to the left, Fig. 10, its set position is determined by abutment with the edge of a fixed horizontal flange 72 formed on a bracket 73 that is secured to the arm 47A of the column. This flange 72 is disposed so as to extend for a short distance over the heads 51 of all of the punches 50 so that when the cradle 54 is returned in an upward direction to its rest position, all of the punches 50 will be held against vertical movement. This insures that the punch heads 51 will be out of the path of the interposers 70 when the next selecting operation is to take place.

The interposers 70 are allocated one to each of the punches 50, and these interposers are actuated from their restored positions of Fig. 10 to their effective positions by means that are under control of a plurality of keys 75 that are afforded in a keyboard K at the front of the machine. In the present instance, the operating connections between the keys 75 and the interposers 70 are of the same general type as illustrated in my aforesaid prior patent. Thus, each interposer 70 has a Bowden cable 76 connected thereto, and the sheaths 76S of these cables are anchored at 77 in the cradle 54. The Bowden cables 76 are extended into operative association with the keys 75 in substantially the same functional relationship that is disclosed in my aforesaid prior patent so that depression of any particular key 75 of the keyboard K causes one or more of such Bowden cables 76 to be actuated, in accordance with the code illustrated in Fig. 18 of the drawings. Reference may be had to my aforesaid prior patent for details of such operative connection of the Bowden cable 76 to the keys 75.

The functional relationship of the keys 75 to the various Bowden cables 76 is the same in the present structure as in my aforesaid prior patent, but the physical structure is somewhat different as will be evident in Figs. 2A, 3 and 4. Thus, each of the keys 75 relating to zero and the significant digits from 1 to 9 is mounted on a key supporting lever 80, and these levers extend rearwardly and are pivoted at 81 in an upstanding mounting bar 82 secured on the base 46. The levers 80 that pertain to zero and to the various "even" digits are terminated just rearwardly of the mounting bar 82, as will be evident particularly in Fig. 2A, while the levers 80 that pertain to all of the various "odd" digits except "9," extend rearwardly for a substantial distance beyond the supporting pivot 81. The levers 80 pertaining to the digits 1 and 2 have ears 83 formed at their lower edges and extended toward each other so that each of the ears 83 is disposed in an overlying relationship with respect to a head 76H that is afforded on what may be termed the first one 76A of the Bowden cables 76. Thus, this Bowden cable 76A may be actuated by depression of either the "1" key or the "2" key. Thus, this arrangement is in accordance with the code shown in Fig. 18 of the drawings, but in respect to the "1" key, an additional perforation must be formed as will be evident in Fig. 18. This is accomplished by operation of the Bowden cable 76E which is normally operated to produce a single perforation in a position representative of the digit 9. Thus, a relatively wide bail 85 is pivoted on arms 86 and 87 on the mounting bar 82, and the bail 85 has a downturned flange 85F at its rear end that is engaged by the rearwardly extended end of any one of the levers 80 pertaining to the odd digits "1," "3," "5" or "7." Thus, the bail 85 is rocked in a counter-clockwise direction about the pivot 81 by the depression of any one of such keys, and the arm 87 is extended forwardly as at 87F, Fig. 2A, and has an ear 87E extended to the left in Fig. 2A so as to overlie the head that is afforded on the Bowden cable 76E. The ear 87E also underlies the key lever 80 of the "9" key, and hence depression of any one of the odd-number keys serves to actuate the Bowden cable 76E so as to thereby produce the perforation in the upper line of the code shown in Fig. 18.

The key levers 80 that carry the "3" and "4" keys are similarly arranged with ears 83 overlying the head 76H of the Bowden cable 76B so that the depression of either one of these keys causes operation of what may be termed the second punch 50 so as to thereby produce a perforation in the second line from the bottom according to the code illustrated in Fig. 18. The key lever 80 associated with the "3" key serves, of course, to operate the bail 85 and thereby produce the desired perforation in the upper line of the code. A similar construction is afforded with respect to the "5" and "6" keys to actuate the Bowden cable 76C, and with respect to the "7" and "8" keys to actuate the Bowden cable 76D, so that the desired code of Fig. 18 may be produced under the control of the several keys representative of the significant digits from 1 to 9.

It will also be observed in Figs. 2A, 3 and 4 that a universal bail 90 is mounted on a pair of arms 91 and 92 that are pivoted at 93 on the mounting bar 82, somewhat below the axis 81 upon which the several key levers 80 are supported. The universal bail 90 has an upwardly extended flange 90F at its forward edge, and this flange 90F is extended in such a way as to be disposed beneath the several key levers associated with the keys allocated to the significant digits from 1 to 9. As will be evident in Fig. 2A, the flange 90F also extends to a point where it underlies the lever 80 associated with the zero key, and this is important in that this universal bail 90 is utilized, among other things, to initiate operation of the single cycle clutch 64.

The several key levers 80 are urged in a clockwise direction to their restored positions by springs 95, and such restored positions are determined by stop plate 96 carried on the top of a guiding comb 97, Fig. 4. The universal bail 90 is urged in a clockwise direction by a spring 98 as shown in Figs. 3 and 4, so that the upper edge of the flange 90F is normally maintained in engagement with the lower edges of all of the key supporting levers 80. When one of the key levers is depressed, and when the key has reached a point relatively close to the lower limit of its travel, the forward edge of the universal bail 90F engages an operating pin 99 which extends downwardly through a guide bushing 99B so as to close a microswitch 100, and, as will hereinafter be described in greater detail, this switch closure completes an energizing circuit to the clutch control solenoid 66, thereby to initiate a single cycle operation of the main drive shaft 60 of the machine. The operation of the universal bail 90 also serves other control functions, as will hereinafter be described in detail, after the physical structure of the machine has been more completely described.

As will be evident in Fig. 1 of the drawings, the keyboard K includes two additional keys, a backspace key 102 disposed adjacent to the zero key, and a tabulating key 103 disposed at the left-hand edge of the keyboard. The tabulating key is pivoted on the axis 81 and is arranged to control a carriage tabulating mechanism 105 which in all practical respects is the same as the tabulating mechanism disclosed in my aforesaid prior patent. This tabulating mechanism includes a pair of horizontal plungers 106 that are normally in a rearward or retracted position, as shown in Fig. 3, and an upstanding arm 107 fixed on the lever 110 that supports the tabulating key 103 has a pin in slot connection 111 at its upper end whereby the plungers 106 are projected in a forward direction when the tabulating key 103 is depressed. When the tabulating plungers 106 are thus projected in a forward direction toward their operative positions, they are disposed in the path of stop pins 112 that are selectively disposed in openings 113 and formed in an escapement bar or rack 115 that is secured to the forward face of a traveling carrier 116 upon which the carriage C is mounted. The escapement rack 115 has teeth 115T along its lower edge that are adapted for cooperation with a plurality of pawls 120, 121 and 122 that afford an escapement means as well as a back-space means for governing movement of the carrier 116. In this respect, it should be pointed out that the carrier 116 is supported for longitudinal movement along the forward face of the frame 46 by a stationary rail 125, the carrier 116 having a plurality of rollers 126 mounted thereon and engaging the various surfaces of the rail 125 to accurately support and guide the carrier 116 for such longitudinal movement. The carrier 116 is urged to the left in what may be termed a character spacing direction by a spring drum 128 having a spring urged tape 129 extended therefrom and connected to the carrier 116 as illustrated in Fig. 2 of the drawings.

Figure 8:
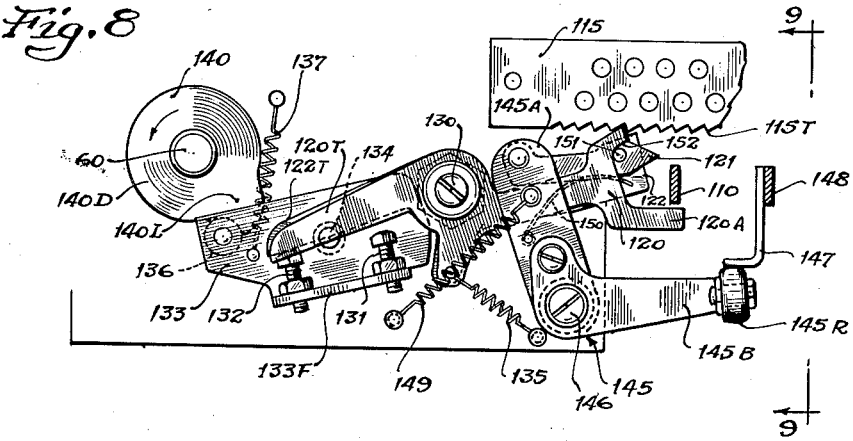
Fig. 8 is an enlarged view illustrating the escapement mechanism and the associated back spacer arrangement.

The pawls 120 and 122 constitute the two normal escapement pawls, and these pawls are pivoted on a horizontal stud 130, as shown in Fig. 8, and have tail portions 120T and 122T extending to the left so as to be disposed in positions wherein they may be alternately engaged by adjustable abutments 131 and 132. The abutments 131 and 132 are in the form of adjustable screws and are mounted on a flange 133F of a rocker 133, this rocker being pivoted on an axis 134 that is parallel to the stud 130. A pair of springs 135 act on the respective pawls 120 and 122 so as to urge the right-hand ends thereof, Fig. 8, toward the toothed edge of the escapement rack 115. When the machine is at rest, a cam roller 136, fixed on the rocker 133, is urged by means of a spring 137 into contact with a dwell surface 140D of a cam 140 that is fixed on the main operating shaft 60 of the machine. When the rocker 133 is in this relation, the stud 131 is out of engagement with the tail 120 of the main escapement pawl 120 so that this pawl is in engagement with the escapement rack 115. The abutment 132, however, is at this time engaged with the tail 122T of the pawl 122 so that this pawl 122 is out of engagement with the escapement rack. In the course of a cycle machine operation, and relatively close to the end thereof, as indicated in the timing chart of Fig. 20, a lobe 140L on the cam 140 engages the cam roller 136 so as to rock the rocker 133 in a counterclockwise direction and then to release the rocker for return to its normal position of Fig. 8. In such rocking movement the abutment 132 moves downwardly so as to allow the secondary escapement pawl 122 to move upwardly into engagement with the rack, and after this has taken place, the abutment 131 engages the tail 120T so as to disengage the pawl 120. The secondary pawl 122 has its tooth portion spaced to the left for approximately one-half of a character space in the usual manner, and hence the carriage C is allowed to move one-half space to the left, and when the parts return to the position shown in Fig. 8, the carriage is allowed to move through the other half space, thereby completing a full character spacing movement.

The tabulating mechanism as hereinbefore described is, of course, operable to attain a tabulating movement of the carriage C only when the main escapement pawl 120 is released, and in order to enable this to be accomplished, the pawl 120 has an arm 120A, Fig. 8, that is extended to the right to a position under the lever 110 that supports the tabulating key 103. Thus, the escapement mechanism is released whenever the tabulating key 103 is depressed, and hence the carriage C is released for movement to the left to the extent determined by the location of the tabulating pins 112 in the bar 115. When the tabulating key 103 is released, the main escapement pawl 120, of course, returns to its effective position.

Figure 9:
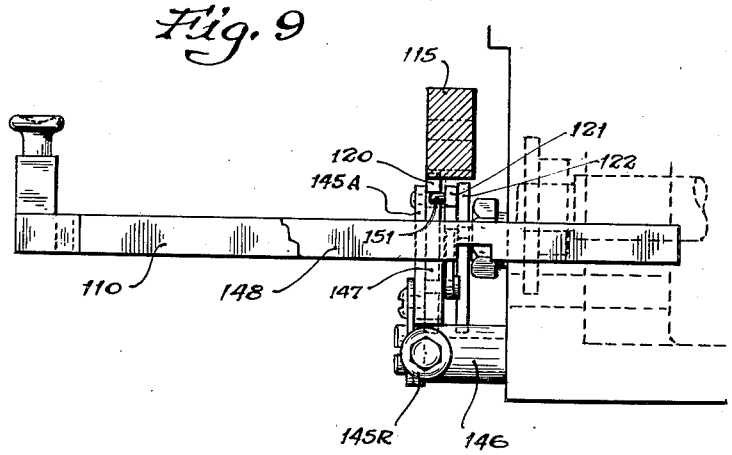
Fig. 9 is a view taken from the line 9—9 in Fig. 8.

The pawl 121 serves as a back-space pawl, and for this purpose is supported pivotally on the upper end of one arm 145A of a bell crank 145. The bell crank 145 is pivoted at 146 as will be evident in Figs. 8 and 9, and another arm 145B extends to the right so that a cam roller 145R formed on the end thereof is disposed beneath a bracket 147 that is fixed on the lever 148 upon which the back-space key 102 is carried. Thus, when the back-space key 102 is depressed, the bell crank 145 is rocked in a clockwise direction against the force of a spring 149, and hence the pawl 121 is moved to the right or, in other words, in a back-spacing direction. The pawl 121 is urged toward engagement with the teeth 115T by a spring 150, and ordinarily the pawl 121 is held out of engagement with respect to the teeth 115T by engagement of a pin 151 on the pawl with a cam surface 152 formed on the pawl 120. However, when the pawl 121 is moved to the right, the pin 151 rides upwardly and to the right along the cam surface 152 so as to engage the pawl 121 with the teeth 115T of the rack. Thus, upon continued right-hand movement of the back-spacing pawl 121, the carriage C is moved through a back-spacing movement and the carriage is retained in its back-spacing position by the main pawl 120 of the escapement mechanism.

Figure 7A:
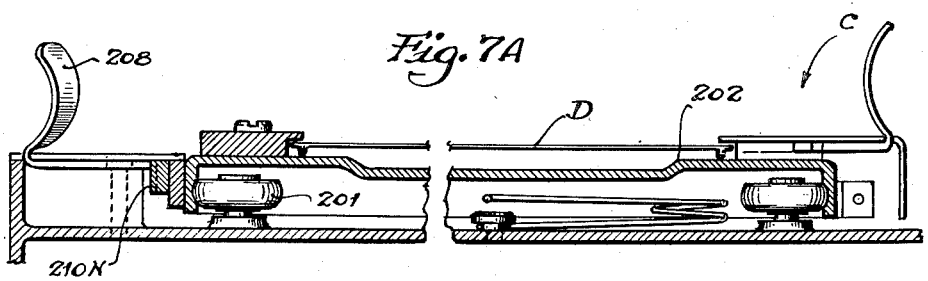
Fig. 7A is an enlarged sectional detail of the carriage mounting.

The carriage C is mounted on the carrier 116 for shifting movement in a front to rear direction between a forward loading position and either one of two different operating positions so that the coded perforations 41 may be formed in either field A or field B of the printing devices. In accomplishing this, a horizontal mounting plate 200 is fixed on the upper edge of the carrier 116, and adjacent opposite ends of the mounting plate 200, guide rollers 201 are supported on the vertical axes, two such rollers being afforded adjacent to each end of the mounting plate 200. The rollers 201 are arranged to engage grooves formed in the internal surfaces of down-turned flanges 202 that are formed along opposite edges of the carriage C, as shown in Figs. 2 and 7A, and thus the carriage C may move in a front to rear direction as guided by the rollers 201. The carriage C is normally urged in a forward direction toward its loading position by a hairpin spring 203, one end of which is connected at 204 to the carriage C while the other end is connected at 205 to the mounting plate 200. The location of the carriage C in either of its operating positions is governed by a positioning pawl 208 that is pivoted on a vertical axis on the mounting plate 200 just to the left of the left-hand edge of the carriage C. A spring 209 urges the rear end of the pawl 208 into engagement with a locating bar 210 that is removably fixed as by screws 211 to the outside surface of the left flange 202 of the carriage C, and the locating bar 210 has two notches 210N formed therein at positions which determine the respective operating positions of the carriage C when such notches 210N are respectively engaged by the pawl 208. When the pawl 208 is engaged with the forward one of the notches 210N, the carriage C is located in its rear operating position so that the perforations 41 will be formed in the field B of the printing device D, and when the pawl 208 is engaged with the other of the two notches, the carriage C will be located in its forward operating position so that the perforations 41 will be formed in the field A of the printing device D.

When the carriage C is to be loaded, the lever 208 is fully released, and the carriage C is shifted to its most forward or loading position which is determined by means including a piston 212, Fig. 1, carried in a forwardly facing position on the carriage C. This piston 212 engages a rearwardly facing dashpot 213 fixed on the mounting plate 200, thereby to bring the carriage C to a cushioned stop in the loading position.

The carriage C is arranged to support the printing device D in a pre-determined position thereon in substantially the same manner as disclosed in Figs. 24 to 27 of my aforesaid prior patent, and for present purposes it is sufficient to point out that the opposite ends edges of the printing devices D are disposed within grooves 214 in opposite side rails of the carriage, and the front to rear position of the printing device on and in respect to the carriage C is determined by releasable positioning means carried on one of the rails of the carriage and acting in the manner described in my aforesaid prior patent.

When the machine is operated, depression of one of the control keys 75 serves through the associated lever system to actuate either one or two of the Bowden cables 76, thereby to shift the related interposer members 70 from the right-hand or restored position shown in Fig. 10 to a left-hand or effective position wherein the ends of such interposer members are disposed between the bar 71 and the related punch heads 51. It is, of course, necessary to restore these actuated interposer members 70, and this is accomplished as shown in Figs. 10 to 12 by means including a restoring plate 220 that is pivoted at 221 at its upper edge on the cradle 54 and above the interposers 70. The lower end edge of the plate 220 is disposed so that upon rocking movement of the plate about its pivot 221 and in a counter-clockwise direction, Fig. 10, this edge will engage shoulders formed on the interposer members 70. Hence, by rocking the plate 220 from the position shown in Fig. 10, and in a counter-clockwise direction, the interposer members 70 may be restored. The plate 220 tends by gravity to assume the vertical position shown in Fig. 10, and the desired rocking force is applied to the plate 220 through an arm or pin 222 that extends to the right from the plate 220 near its upper edge, as will be evident in Figs. 10 to 12. The free end of the pin 222 is arranged so that it is disposed over one end of an operating lever 223 which is pivoted intermediate its ends on a pivot pin 224 carried on a laterally projecting bracket arm 225 that is fixed on the cradle 54. At its extended other end, the lever 223 has an actuating rod 227 connected thereto by means including a swivel block 228. This actuating rod 227 extends downwardly through the bottom plate 45 of the machine and is connected pivotally at 229 to the armature of an operating solenoid 230. Thus when the solenoid 230 is energized, the rod 227 is pulled downwardly so as to rock the operating lever 223. This serves to impart an upward force to the pin 222, thereby to rock the restoring plate 220 in a counter-clockwise direction, Fig. 10, so as to restore all of the interposer elements 70.

Under and in accordance with the present invention, the restoring means for the interposer members 70 is controlled by several keys 75 of the keyboard K in such a way that the restoring means are operated each time an actuated key 75 is returned to its uppermost or normal position, and such restoring means are released only when one of the keys 75 is depressed slightly from its upper or normal position. Through this arrangement, false setting of the interposers 70 due to partial depression of a key 75 is avoided. In accomplishing this operation of the restoring means, a circuit is afforded for the restoring solenoid 230 which is closed at all times during use of the machine except when a key 75 is slightly depressed from its normal or upper position. Thus, in Fig. 19 of the drawings, the electrical circuit for the machine is illustrated, and it will be observed that a connecting cord 235 has one wire 236 thereof connected through a terminal block 237 and a wire 238 to one contact of a main control switch 239. The other contact of the switch 239 is connected by a wire 240 through the terminal block 237 and a wire 241 to one terminal of a main drive motor 242 that serves through a belted connection to constantly drive the main pulley 63 of the machine. A branch lead 243 extended from the wire 240 is connected to a wire 244 which represents one side of the various control circuits in the machine. The connector cord 235 also includes a wire 246 that extends through the terminal block 237 and a wire 247 to a wire 248 that constitutes the other side of the various control circuits in the machine.

The restoring solenoid 230 has one terminal thereof connected by a wire 249 to the wire 248. The other terminal of the solenoid 230 is connected by a wire 250 to one contact of a switch 251 that normally tends to open, the other contact of which is connected by a wire 252 to the other side of the circuit as represented by the wire 244. The switch 251 is mounted on the lower surface of the mounting plate 45 directly beneath the rear end of the arm 91 of the universal bail 90. When the universal bail 90 is in its normal position of Fig. 3, the switch 251 is maintained closed by an adjustable link 255 that is connected to the rear end of the arm 91 and which extends downwardly through the plate 45 into a position wherein it engages the upper blade of the switch 251. Thus the energizing circuit for the restoring solenoid 230 is maintained closed when all of the keys 75 are in their normal or upper positions. When one of these keys is slightly depressed so as to rock the universal bail 90 in a counter-clockwise direction, the rod 255 is raised and the switch 251 is permitted to open. This deenergizes the solenoid 230, and the operating rod 227 is moved in an upward direction by a spring 227S, Figs. 3 and 13 to 15. This rocks the lever 223 in a counter-clockwise direction, Fig. 12, thereby to permit the restoring plate 220 to move to its ineffective position of Fig. 10. Hence, as an incident to the first downward movement of any key 75, the interposer members 70 are released for the setting movement that will be imparted to one or more of such interposer members upon continued downward movement of the particular key 75. However, when the operator does not complete such downward movement of the key to an extent which will cause punching operation of the machine, the release of the key so as to allow the same to return to its upper position causes the switch 251 to be closed so that the solenoid 230 will be operated and all of the interposer members 70 will be restored as an incident to the return of the key to its uppermost position.

When a key 75 is properly operated through its full downward stroke, the interposer members 70 are set into their operative positions and the clutch solenoid 66 is energized so as to initiate a cycle of punching operation of the machine. The energizing circuit for the clutch solenoid 66 includes the switch 100 that is operated by the universal bail 90, and in addition, this circuit includes safety switch means that are effective to prevent misoperation of the machine. Thus, one terminal of the clutch solenoid 66 is connected by a wire 260 to one side of the circuit as represented by wire 248. A wire 261 extends from the other terminal of the solenoid 66 and is connected by a wire 262 to one contact of a normally open safety switch 263. The other contact switch 263 is connected by a wire 264 to one contact of the main control switch 100, the other contact of this switch being connected by a wire 265 to another safety switch 266C. The other contact of the switch 266C is connected by a wire 267 to one contact of still another safety switch 266, the other contact of which is connected by a wire 267C to the other side of the circuit as represented by wire 244. The switch 266 is disposed near the left-hand side of the machine near the front thereof, and this switch is normally closed. One contact of the switch, however, has a block 266B thereon that is adapted to be engaged by a bracket 268 that is fixed on the carrier 116 of the carriage C. The arrangement is such that when the carriage C has moved into what constitutes the last punching position, the operation of the punching means through an operating cycle, and the operation of the escapement after such punching has been completed, causes the bracket 68 to engage the block 266B, thereby to break the energizing circuit for the clutch solenoid 66. The switch 266C is carried on and below a stationary plate 269 that is disposed below the mounting plate 200 of the carriage C, and a stud 269A on an arm 269B on the carriage C is arranged, when the carriage is in its forward or loading position, to open the switch 266C. This structure is shown in Figs. 1, 1A, 2 and 3, and it will be observed that the plate 269 has a rocking bail 269C pivoted thereon so that the cross bar thereof is disposed above the plate 269. Both arms of the bail 269C extend downwardly through the plate 269 to a supporting pivot 269D, and one arm 269E is arranged to operatively engage the switch 266C to open the same. This occurs when the cross bar of the bail 269C is engaged by the stud 269A at the end of the forward travel of the carriage C. Thus the clutch solenoid circuit is disabled at all times except when the carriage is in one of its operating positions.

The switch 263 that is included in the energizing circuit for the clutch solenoid 66 is arranged to be operated in such a way that the machine can not be operated through a new cycle of operation until the previously actuated key 75 has been fully released and has returned to its uppermost position. In accomplishing this operation of the switch 263, an operating rocker 270 is supported on a stud 271 from a mounting bracket 272 that extends downwardly from the plate 45. The operating rocker 270 has a pin 273 extending rearwardly from one end thereof, and this pin extends into a vertical slot 274 in the bracket 272 so as to thereby limit the range of rocking movement of the rocker 270. A spring ball detent 272B mounted in the stud 271 is arranged to engage one or the other of a pair of recesses in the rocker 270 to releasably hold the rocker in one or the other of its two positions. The pin 273 is also arranged to engage a block 275 that is afforded on the lower blade of the switch 263, as will be evident in Figs. 13 to 15, and hence, when the rocker is in the position of Fig. 13, the pin 272 engages the block 275 and closes the normally open switch 263. The rocker 270 is arranged to be actuated in a counter-colckwise direction to the position of Fig. 13 whenever the solenoid 230 is operated, and this is accomplished by a block 278 fixed on the rod 227 and arranged in the downward movement of the rod 227 to engage the left-hand end of the rocker 270, as will be evident in Fig. 13. Thus, when the solenoid 230 is operated, the rocker 270 is moved to the position of Fig. 13 so as to thereby close the switch 263, and it should be observed that this occurs only when all of the keys 75 have been returned to their upper or normal positions.

When the depression of a key 75 is started, the solenoid 230 is, of course, deenergized early in the downward movement of such key, as will be evident in Fig. 20, which constitutes a timing chart of the various elements of the machine, and the parts thus assume the relationship shown in Fig. 14 of the drawings. In this connection it will be observed that the rocker 270 is held by its detent 272B in the position to which it has been moved by the action of the solenoid 230 and the block 278 so that the switch 263 remains closed. Hence, upon further downward movement of the key 75, the main control switch 100 is closed so as to thereby energize the clutch solenoid 66 and initiate a punching cycle of the machine.

In the course of this punching cycle, means are effective to shift the rocker 270 from its switch-closing position of Figs. 13 and 14 to a released or switch-opening position of Fig. 15, and as herein shown, such means are associated with the cradle 54 and are operated as an incident to the downward movement of the punch supporting cradle. Thus, as will be evident in Figs. 1 to 3 and 10 to 12, the bracket 225 has a push rod 280 connected thereto by means including a swivel block 281. This push rod 280 extends downwardly through the plate 45, and the lower end thereof is disposed directly over a right-hand end portion of the rocker 270, as will be evident in Figs. 13 to 15. When the cradle 54 moves downwardly in the course of a punching operation, the rod 280 engages the right-hand end of the rocker 270, Figs. 13 to 15, and shifts the rocker 270 from the position shown in Fig. 14 to the position shown in Fig. 15. This serves to cause the switch 263 to open, and hence it is impossible to again energize the clutch solenoid 66 until the switch 263 has been returned to its closed position. This, of course, takes place only after all of the keys have been returned to their upper or normal positions, since it is only under such conditions that the restoring solenoid 230 is operated. Hence, it will be clear that when the restoring solenoid 230 is operated, the engagement of the block 278 with the left-hand end of the rocker 270 will shift the rocker 270 from its switch-opening position of Fig. 15 to its switch-closing position of Fig. 13. When this occurs, the machine is conditioned for its next punching cycle, unless, of course, the safety switches 266 or 266C have been opened due to movement of the carriage C beyond its most left-hand position, or to movement of the carriage C to its loading position.

In respect to the timing of the restoring operation of the solenoid 230, it should be pointed out that the total time of the punching cycle of the machine after closure of the main control switch 100 is relatively short, and the time required for a key 75 to return from its fully depressed position is such that the machine cycle is in every instance completed or substantially completed before the upward return movement of such key can cause operation of the restoring solenoid 230. Hence, the interposers 70 are in every instance allowed to remain in their set positions until they have accomplished their desired controlling function, and yet, such interposers 70 are invariably restored to their inactive positions by the same means which condition the machine for its next cycle of operation.

From the foregoing description it will be apparent that under the present invention the restoring function in respect to the interposers has been rendered independent of the operation of the punching means, and the control of the restoring function has been attained by the control keys in such a way that false setting of the interposers is avoided in every instance.

It will also be evident that under the present invention the same apparatus may be utilized to produce coded perforations in either of two different fields in a printing and control device, and hence the production of such devices is materially simplified.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a machine for forming control devices with punched representations of desired control data in selected positional relationships on such control devices, a plurality of punches for selective operation to form coded data representations on a control device, a movable carriage for positioning such control device with relation to said punches, punch actuating means for said punches including a cradle in which said punches are supported, a plurality of selector elements mounted on said cradle and individually shiftable from normal inoperative positions for rendering said actuating means operative selectively with relation to said punches, a plurality of selectively depressible control keys, means operatively connecting the keys to each of the selector elements to impart movement to related selector elements into an operative position when the keys are selectively actuated, restoring means mounted in part upon said cradle and normally effective separately from said punch-actuating means to return said selector elements to their normal inoperative positions, and means operatable to render said restoring means ineffective when any one of said keys is depressed from its normal position and to again render said restoring means effective when such a key returns to its normal position.

2. In a machine for forming control devices with punched representations of desired control data in selected positional relationships on such control devices, a plurality of punches for selective operation to form coded data representations on a control device, actuating means for said punches, a movable carriage for positioning such control device with relation to said punches, actuating means for said punches including a cradle in which said punches are supported, a plurality of selector elements mounted on said cradle and individually shiftable from normal inoperative positions to operative positions for rendering said actuating means operative selectively with relation to said punches, a plurality of selectively depressible control keys, means operatively connecting the keys to each of the selector elements to impart movement to related of the selector elements into an operative position when the keys are selectively actuated, means operable upon depression of any one of said keys to set said punch actuating means into operation, restoring means movable between an effective restoring position in which said selector elements are returned to their normal inoperative positions and a released position wherein said selector elements are free for setting movements, and actuating means for said restoring means for rendering said restoring means ineffective when any one of said keys is actuated downwardly through more than a relatively short upper portion of its range and for rendering said restoring means effective when said key is returned to said upper portion of its range.

3. In a machine for forming control devices with punched representations of the desired control data in predetermined positional relationship on such control devices, a plurality of punches for selective operation to form coded data representations on a control device, a movable carriage for positioning such control device with relation to said punches, actuating means for said punches including a cradle having a horizontal bar at the bottom thereof, said bar providing a support for said punches, a plurality of selector elements carried in said cradle individually shiftable from normal inoperative positions to operative positions for rendering said actuating means operable selectively with relation to said punches, a plurality of manually actuable control keys each operable selectively, means operatively connecting the keys to each of selected selector elements to impart movement to such selector elements into an operative position when the keys are actuated, restoring means for said selector elements and movable between an effective restoring position and an ineffective releasing position, and means for rendering said restoring means ineffective when any one of said keys is actuated from its normal position and for rendering said restoring means effective when such a key is returned to its normal position.

4. In a machine for forming control devices, a plurality of punches, a plurality of selectively operable control keys for selecting the punch or punches to be actuated, actuating means for said punches including a shaft rotatable through one revolution during each punching cycle, a normally disengaged single-cycle clutch effective when engaged to operatively connect the shaft with a power source, a solenoid effective when energized to permit engagement of said clutch, an energizing circuit for said solenoid including a normally open main control switch and a safety switch, means operable upon operation of any one of said keys to close said main switch to energize the solenoid and enable the engagement of the clutch to rotate the shaft, means operable during rotation of said shaft to open said safety switch, and means operable only as an incident to the return of the actuated key through a relatively short upper portion of its range to its normal position to again close said safety switch.

5. In a machine for forming control devices, a plurality of punches, actuating means for said punches including a shaft rotatable through one revolution during each punching cycle, punch selecting means for selectively rendering said actuating means operable upon said punches, said selecting means including a plurality of manually actuatable keys, a normally disengaged one-revolution clutch effective when engaged to operatively connect the shaft with a power source, a solenoid effective when energized to permit engagement of said clutch, an energizing circuit for said solenoid including a normally open key-controlled main switch and a normally open safety switch, an actuating rocker having an effective position wherein said safety switch is held closed and an ineffective position wherein said safety switch is allowed to open, means operable when any of said keys is actuated to close said main switch to energize the solenoid and enable engagement of the clutch to rotate the shaft, means operable on said rocker during rotation of said shaft to shift the rocker to its ineffective position and thereby open said safety switch, and means operated when the keys have moved upwardly through relatively short upper portions of their range and are all in their normal positions to shift said rocker to its effective position and thereby close said safety switch.

6. In a punching apparatus for producing coded data representing perforations in printing and control devices, a plurality of punches, means for selectively operating said punches including an actuating member and associated interposer members selectively shiftable through setting movements to set positions and through restoring movements to restored positions, manually operable keys selectively operable from normal positions to fully actuated positions to selectively actuate said interposer members and to thereafter initiate operation of said actuating member, restoring means for imparting restoring movement to said interposer members and shiftable between released and effective positions, a control switch having open and closed relations operable under control of said keys to assume one relation when all of said keys are in their normal positions and to assume the other relation as soon as one of said keys is moved from its normal position, and electrically operable actuating means for said restoring means governed by said switch to restore said interposers when said switch is in said one relation and to release said interposers when said switch is in said other relation.

7. In a machine for forming control devices with punched representations of desired control data in selected positional relationships on such control devices, a plurality of punches for selective operation to form coded data representations on a control device, a movable carriage for positioning such control device with relation to said punches, actuating means for said punches including a cradle in which said punches are supported, operating means for said cradle including a single-cycle clutch, a solenoid for causing engagement of said clutch, a plurality of selector elements mounted on said cradle and individually shiftable from normal inoperative positions to operative positions for rendering said actuating means operative selectively with relation to said punches, a plurality of selectively depressible control keys movable downwardly through a range consisting of a relatively short upper portion and a lower portion, means operatively connecting the keys to each of the selector elements to impart movement to related selector elements into an operative position when the keys are selectively actuated downwardly through said lower portion of their range, normally effective restoring means mounted in part upon said cradle and operative to return said selector elements to their normal inoperative positions, means operatable to render said restoring means ineffective when any one of said keys is depressed from its normal position through and beyond said upper portion of said range and to again render said restoring means effective when such a key returns to said upper portion of its range, an energizing circuit for said solenoid including a normally open main control switch and a safety switch, means operable upon operation of any one of said keys to close said main switch to energize the solenoid and enable the engagement of the clutch, means operable during operation of said punches to open said safety switch, and means operable at the time when said restoring means is again rendered effective to again close said safety switch.

8. In a machine for forming control devices, reciprocable punch-supporting and actuating cradle, a plurality of punches carried on said cradle, actuating means for said cradle including a shaft rotatable through one revolution during each punching cycle, punch selecting means for selectively rendering said actuating means operable upon said punches, said selecting means including a plurality of manually actuatable keys movable downwardly through a range consisting of a relatively short upper portion and a lower portion and a plurality of interposers on said cradle adapted to be selectively set by said keys as such keys are actuated through said lower portions of their range, a normally disengaged one-revolution clutch effective when engaged to operatively connect the shaft with a power source, a solenoid effective when energized to permit engagement of said clutch, an energizing circuit for said solenoid including a normally open key-controlled main switch and a normally open safety switch, an actuating rocker having an effective position wherein said safety switch is held closed and in ineffective position wherein said safety switch is allowed to open, means operable when any of said keys is actuated downwardly to substantially the lower end of said lower portion of its range to close said main switch to energize the solenoid and enable engagement of the clutch to rotate the shaft, means carried on said cradle and operable on said rocker during rotation of said shaft to shift the rocker to its ineffective position and thereby open said safety switch, and means operatable under control of said keys when the keys are all in said upper portions of their range to concurrently restore said interposers and shift said rocker to its effective position and thereby close said safety switch.

9. In a machine for forming control devices with punched representations of desired control data in selected positional relationships on such control devices, a plurality of punches for selective operation to form coded data representations on a control device, actuating means for said punches, a movable carriage for positioning such control device with relation to said punches, actuating means for said punches including a cradle in which said punches are supported, a plurality of selector elements mounted on said cradle and individually shiftable from normal inoperative positions to operative positions for rendering said actuating means operative selectively with relation to said punches, a plurality of selectively depressible control keys movable downwardly through a range consisting of a relatively short upper portion and a lower portion, means operatively connecting the keys to each of the selector elements to impart movement to related of the selector elements into an operative position when the keys are selectively actuated, means operable upon depression of any one of said keys to set said punch actuating means into operation, restoring means operative to return said selector elements to their normal inoperative positions, disabling means operable in each operation of said punch to disable said punch actuating means, and means governed solely by said keys separately from the operation of said actuating means and operable whenever all of said keys are in said upper portions of their range to concurrently actuate said restoring means and render said disabling means ineffective.

10. In a punching apparatus for producing coded data representing perforations in printing and control devices, a main frame, selective punching means on said frame including a plurality of punches defining a punching station, actuating means for said punches, a carrier mounted on said frame for movement past said punching station in character spacing and return directions, a carriage having means for removably holding a printing plate in a predetermined relation thereon, means supporting said carriage on said carrier for movement on said carrier between positions displaced from each other in a front to rear direction, the forward one of such positions of the carriage constituting a loading position and another of said positions constituting a working position, means yieldingly urging said carriage to said loading position, means for releasably holding said carriage in said working position, and means operable by said carriage when said carriage is in said loading position to disable said actuating means.

11. In a punching apparatus for producing coded data representing perforations in printing devices having a plurality of data fields, a main frame having means including a plurality of punches mounted thereon and defining a punching position, selecting means for selecting said punches for operation, punch actuating means for said punches controlled by said selecting means, a carrier mounted for longitudinal shifting movement in character spacing and return directions along said frame forwardly of said punching position, a carriage having means thereon for supporting such a printing device in a predetermined position thereon, means supporting said carriage on said carrier for shifting movement relative to said carrier from a forward loading position to a first rearwardly displaced working position in which such a printing device mounted on said carriage has one of its fields aligned with said punching position, and for further shifting movement in rearward direction to a second working position wherein the other field of such a printing device is aligned with said punching position, means for holding said carriage in either of said working positions, and means operated by said carriage in the loading position thereof to disable said punch actuating means.

12. In a punching apparatus for producing coded data representing perforations in printing and control devices, a main frame, selective punching means on said frame including a plurality of punches defining a punching station, a carrier mounted on said frame for movement past said punching station in character spacing and return directions, a carriage having means for removably holding a printing plate in a predetermined relation thereon, means supporting said carriage on said carrier for movement on said carrier between three positions displaced from each other in a front to rear direction, the forward one of such positions of the carriage constituting a loading position and the other two positions constituting working positions in which different data-receiving fields of such a printing device will be disposed in alignment with said punching station, means yieldingly urging said carriage to said loading position, and means for releasably holding said carriage in either one of said working positions.

13. In a punching apparatus for producing coded data representing perforations in printing and control devices, a main frame, selective punching means on said frame including a plurality of punches defining a punching station, a carrier mounted on said frame for movement past said punching station in character spacing and return directions, a carriage having means for removably holding a printing plate in a predetermined relation thereon, means supporting said carriage on said carrier for movement on said carrier between three positions displaced from each other in a front to rear direction, the forward one of such positions of the carriage constituting a loading position and the other two positions constituting working positions in which different data-receiving fields of such a printing device will be disposed in alignment with said punching station, and means yieldingly urging said carriage to said loading position.

CARL J. HUEBER.

REFERENCES CITED

The following references are of record in the file of this patent:

UNITED STATES PATENTS

| Number | Name | Date |
| --- | --- | --- |
| 1,989,887 | Schaaff | Feb. 5, 1935 |
| 2,034,341 | Gregory | Mar. 17, 1936 |
| 2,265,222 | Benes | Dec. 9, 1941 |
| 2,397,112 | Hueber | Mar. 26, 1946 |